United States Patent [19]

Miller et al.

[11] 4,277,217
[45] Jul. 7, 1981

[54] LOAD TRANSFER APPARATUS

[75] Inventors: James S. Miller; Frank M. Lauyans; Edwin T. Hilger, all of Louisville, Ky.

[73] Assignee: A-T-O Inc., Willoughby, Ohio

[21] Appl. No.: 46,938

[22] Filed: Jun. 7, 1979

[51] Int. Cl.³ .......................................... B65G 25/08
[52] U.S. Cl. .................................. 414/395; 198/485; 198/721; 198/746
[58] Field of Search ............... 198/485, 486, 470, 572, 198/721, 746, 747, 744, 429, 471, 791, 472; 414/82, 85, 531, 344, 395, 786; 244/137 R

[56] References Cited

U.S. PATENT DOCUMENTS

| 2,550,523 | 4/1951 | Borgerding | 198/744 X |
| 4,030,618 | 6/1977 | Kelley et al. | 414/82 X |
| 4,056,186 | 11/1977 | Hill | 198/472 X |
| 4,114,767 | 9/1978 | Fur | 198/744 X |

FOREIGN PATENT DOCUMENTS 530473 10/1921 France ...................... 414/344

Primary Examiner—Bruce H. Stoner, Jr.
Assistant Examiner—Douglas D. Watts
Attorney, Agent, or Firm—Wood, Herron & Evans

[57] ABSTRACT

Apparatus for transferring loads between conveyors or between a conveyor and a load handling cart, support, or other apparatus includes a split conveyor and an extensible load shifting frame disposed within the split. The shifting frame is provided with load engaging dogs which are selectively actuable above the load conveying plane of the split conveyor to shift the load therefrom and onto a conveyor, cart or the like. Frame and dog actuating means are provided as are conveying methods.

32 Claims, 13 Drawing Figures

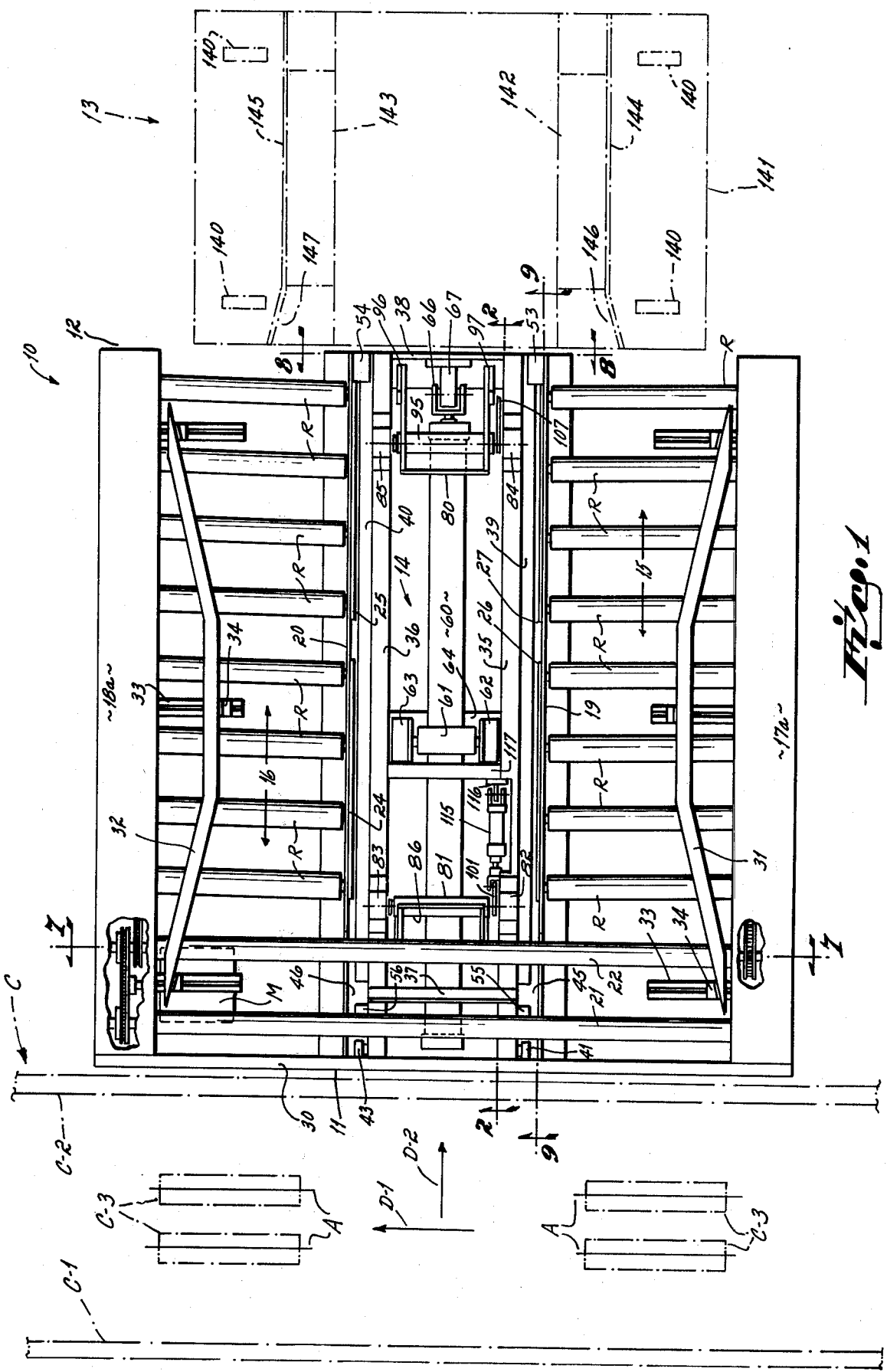

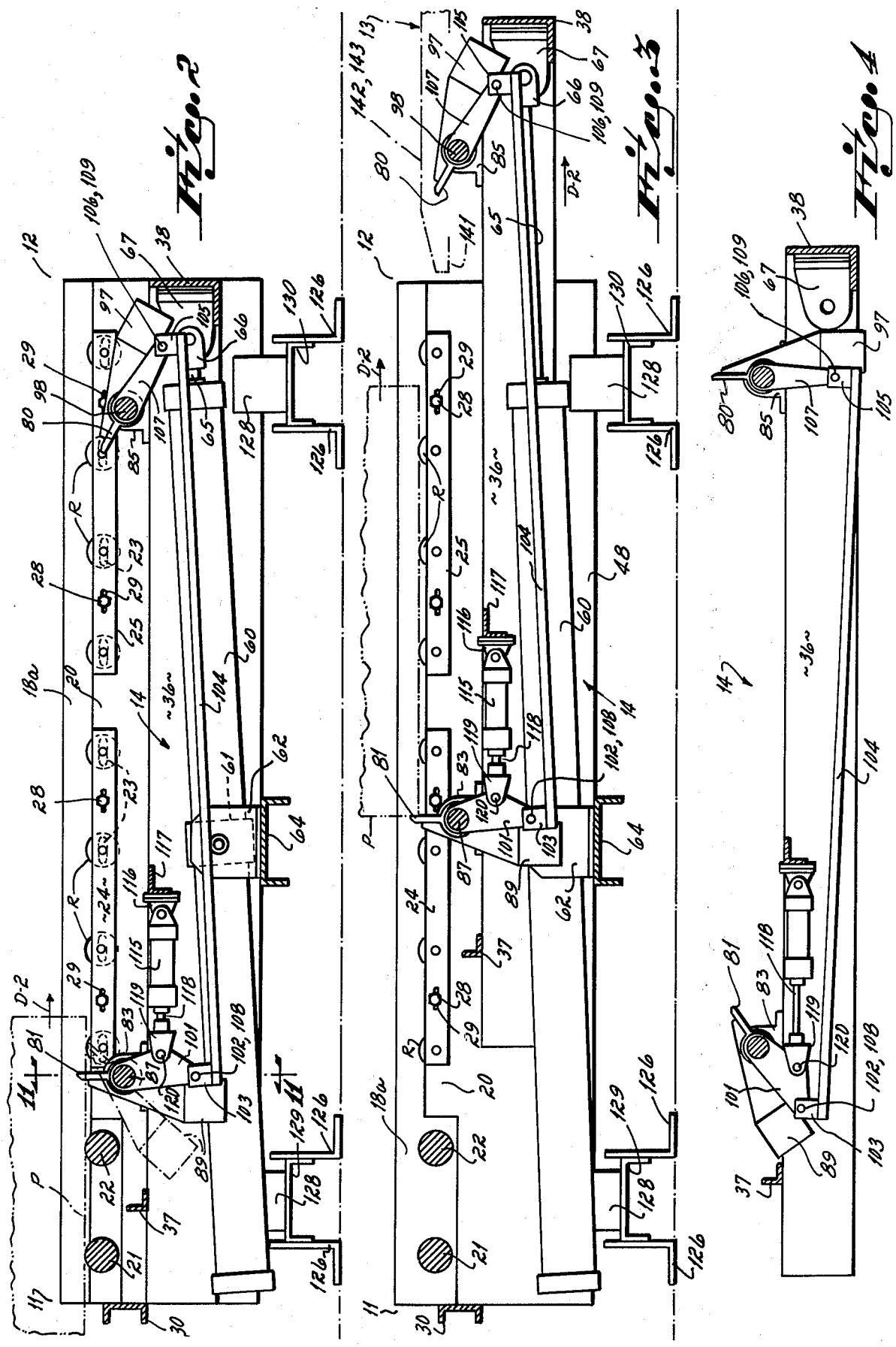

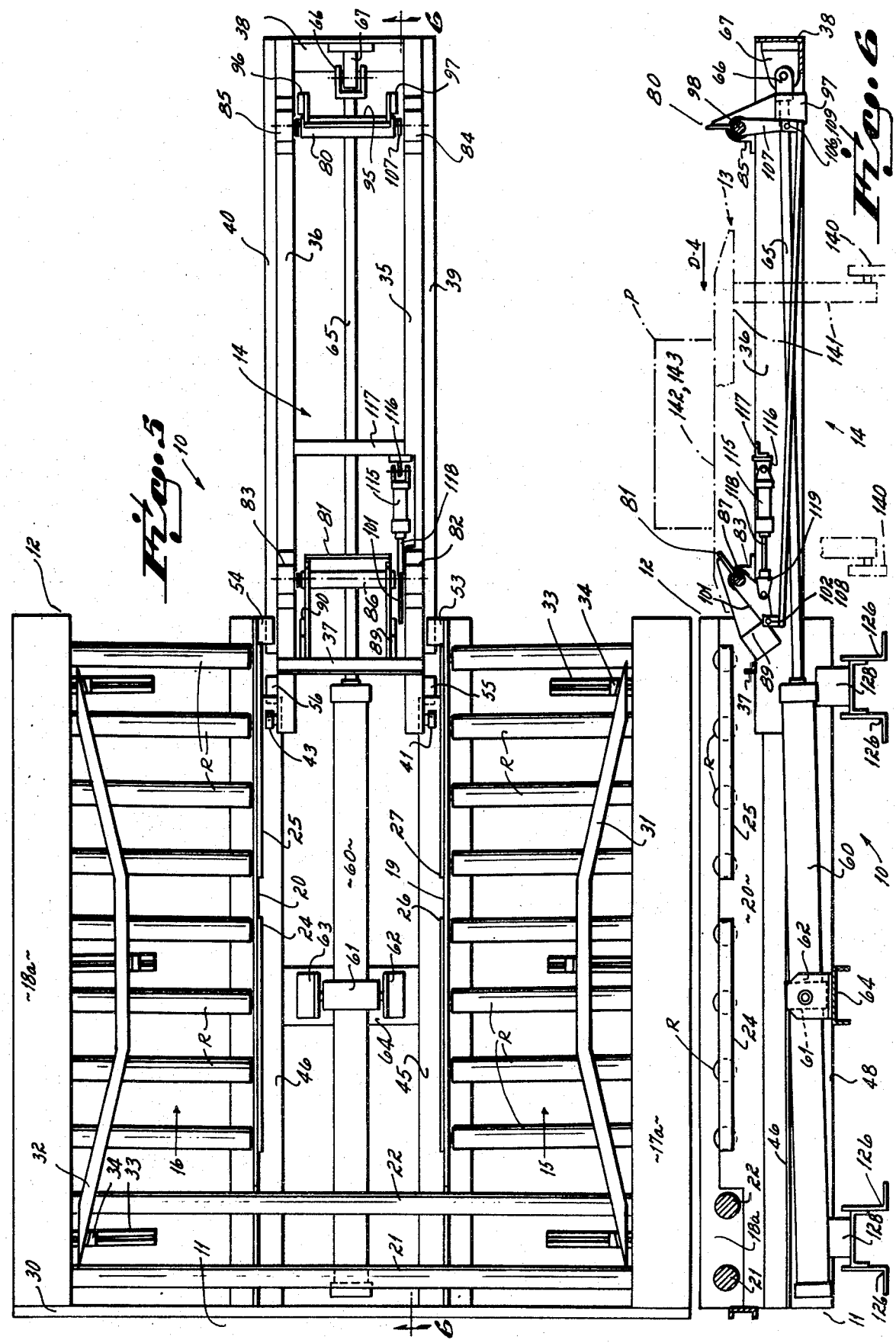

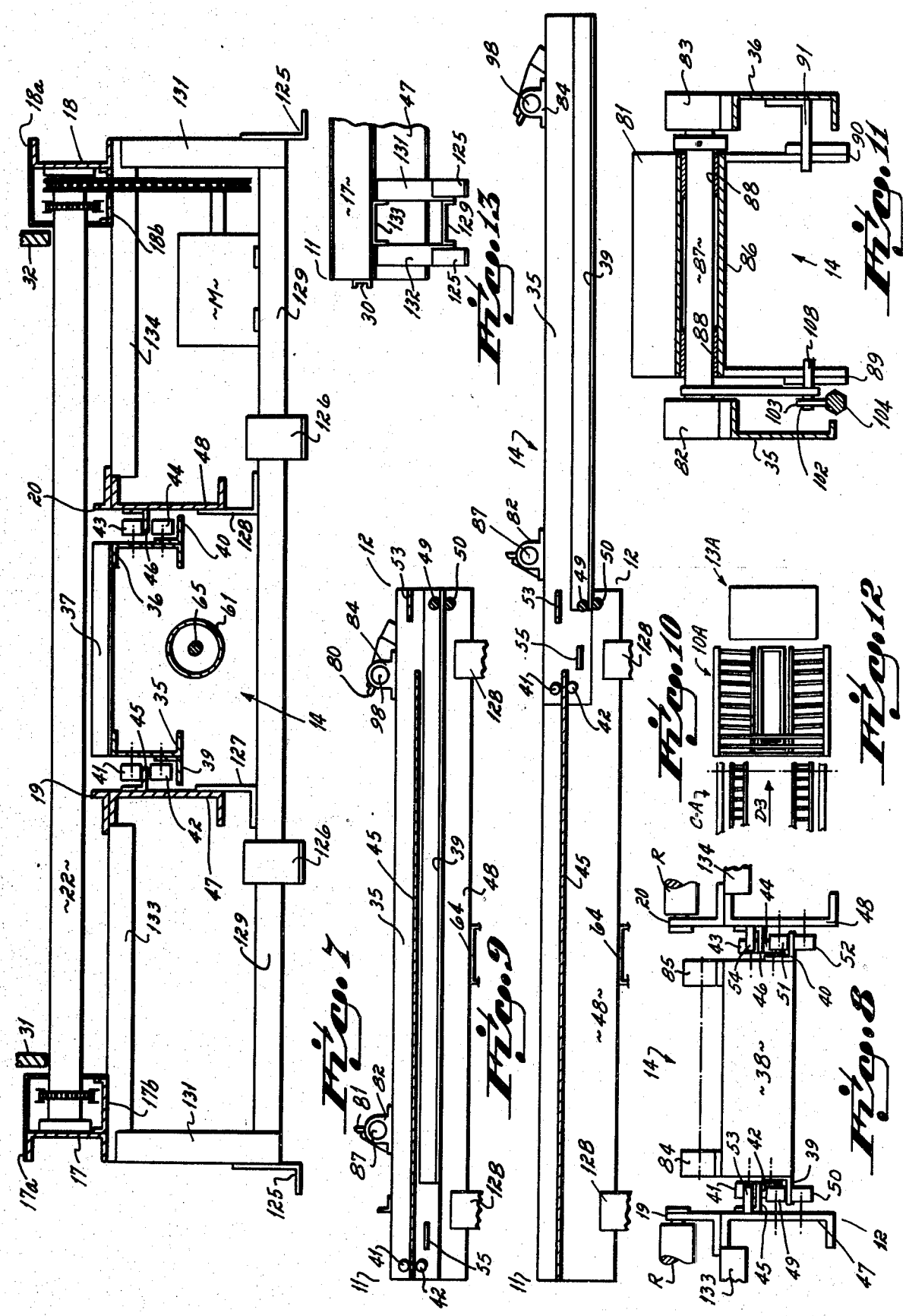

LOAD TRANSFER APPARATUS

This invention relates to conveying methods and apparatus, and more particularly to methods and apparatus for transferring a load between conveying apparatus or between a conveyor and load handling apparatus such as a cart or load support.

In manufacturing or warehousing facilities conveyor systems sometimes require a conveyed load to be moved to a location not on the direct conveyor line. Due to numerous load destinations, space, or to other limiting factors, extensions of existing conveyors or of planned conveyors are not entirely suitable. Also, it is desirable to transfer loads between conveyors or between a conveyor and other load handling apparatus such as a cart or a load support.

In one solution to the problem, loads are transferred from a conveyor to another location in the facility via an independent cart which is pulled from adjacent the conveyor to the load destination. Where, however, the loads are bulky, or are heavy, such as several hundred pounds or more, the transfer of the load from a conveyor to a cart constitutes a difficult task, and generally requires raising the load from the conveyor, moving it over the cart, and lowering the load. This process is repeated in reverse for unloading the cart. Alternately, such carts are themselves provided with conveyors as their load supporting surfaces to facilitate loading and unloading. This increases the expense and complexity of the cart, particularly where its conveyor is powered. Also, prior known auxiliary devices for lifting, transferring and lowering the loads from conveyor to conveyor or between a conveyor and a cart, or a load support, for example, are themselves bulky and expensive.

In another aspect of the problem, it is considered desirable to provide apparatus for both transferring loads from a conveyor onto a cart, and as well to reverse the procedure so as to transfer, on the same apparatus, loads from a cart, for example, back to a conveyor. The reversing capability is difficult to achieve, however, since the elements for one motion are only in the way of elements necessary to achieve the reversing operation.

Accordingly, it has been one objective of this invention to provide improved transfer methods and apparatus for transferring loads between conveyors or between a conveyor and a cart or a load support, for example.

A further objective has been to provide a reversible transfer apparatus for selectively transferring loads in opposite directions.

A further objective of the invention has been to provide transfer apparatus for transferring loads transversely from one conveyor to another conveyor, cart, or load support, or for transferring loads in a parallel direction from the end of one conveyor to another conveyor, cart or load support.

A further objective of the invention has been to provide apparatus for transferring loads to and from a cart or a load support without lifting the load.

A further objective of the invention has been to provide an improved load transfer apparatus and system where the loading, unloading and load centering are all performed from beneath the load.

To these ends, a preferred embodiment of the invention includes a transfer apparatus comprising load supporting and conveying means and load shifting means operably disposed to function in the same direction as the supporting and conveying means. The conveying means is operable to receive a load at one end, and to move it to a position thereon where the load shifting means can engage the load to push it onto a conveyor, cart, or a load support, all without lifting the load from its position on the transfer apparatus. Alternately, the load shifting means is extensible outwardly of the apparatus to engage a load from beneath and to shift it onto the apparatus for transfer to a conveyor, for example.

More particularly, the preferred conveying means comprises, in part, a pair of roller conveyor lines or paths and load shifting means disposed generally between and just beneath the two lines. The shifting means is capable of selective engagement with the center of a load disposed on and across the two lines for shifting a load off the apparatus, or it can be extended beneath a load for drawing it onto the apparatus.

The load shifting means comprises a shiftable or extensible frame, beneath the load, havings dogs at each end for selectively engaging and pushing the load, in one position, and for selectively folding beneath a load in another position. Preferably, the dogs are operationally connected together to co-operate with movement of the frame and the desired load transfer. The construction and operation of the dogs provide a reversible apparatus, permitting use of the transfer apparatus in opposite directions, the operative dog in one direction being passive during loading or during the use of the other dog operating in the other direction.

While the transfer apparatus functions in both forward and reverse directions, it generally has a receiving end disposed adjacent a conveyor and a discharge end disposed adjacent another conveyor, cart, or a load support. In this regard, the receiving end of the transfer apparatus can be placed near a side of a conveyor for receiving loads transversely therefrom, or near an end of a conveyor for receiving and transferring articles in the same direction as the conveyor direction.

To complete the loading of a cart or load support, for example, from the transfer apparatus, it is not necessary to lift the load or to provide a roller conveyor on the cart or load support. Instead, and according to the invention, the cart or load support is simply provided with transverse skids for slidably receiving the load from the transfer apparatus. The skids are disposed on the cart in approximately the same plane, or in an intersecting plane, as with the plane formed by the load supporting surfaces of the conveyors on the transfer apparatus, and the load can simply be pushed onto the cart.

When it is desired to unload a cart, or to transfer a load onto a conveyor for example, the cart is positioned adjacent the apparatus and the shiftable frame is extended beneath the load. A forward dog is then raised to engage the load and the load is pulled from the cart onto the transfer apparatus.

In one aspect of the invention, the load engaging dogs are controlled positively to move to a retracted position beneath the load, but are counterweighted to rotate by their own inertia to an upright load engaging position when not positively retracted. This eliminates potential jams and accidents, for example, in the event the shifting frame is extended or retracted when the rear side of a dog is raised and hits a load. In this event, the dog simply pivots beneath the load, and does not positively engage it, which could push the load off the cart on its other side, or onto a crowded conveyor.

Accordingly, the invention provides a unique load transfer apparatus comprising a combination of elements which operate together to produce a load transfer not before obtainable with the elements operating alone. The invention provides the advantageous result of providing methods and apparatus for safely transferring loads, in either transversely or parallel directions between conveyors or conveyors and carts or load supports, without lifting of the loads between the apparatus and the cart or load support for example.

These and other advantages will become readily apparent from the following detailed description of a preferred embodiment and from the drawings in which:

FIG. 1 is a plan view of a preferred embodiment of the invention;

FIG. 2 is a cross-sectional view taken along lines 2—2 of FIG. 1;

FIG. 3 is a view similar to FIG. 1 showing the apparatus in partially extended position;

FIG. 4 is a side elevational view of a portion of the apparatus of FIG. 3 and in a different position;

FIG. 5 is a view similar to FIG. 1 showing the apparatus in an extended position;

FIG. 6 is a cross-sectional view taken along lines 6—6 of FIG. 5;

FIG. 7 is a cross-sectional view taken along lines 7—7 of FIG. 1;

FIG. 8 is a cross-sectional view taken along lines 8—8 of FIG. 1;

FIG. 9 is a cross-sectional view taken along lines 9—9 of FIG. 1;

FIG. 10 is a view similar to FIG. 9 but showing this apparatus in an extended condition;

FIG. 11 is a cross-sectional view taken along lines 11—11 of FIG. 2;

FIG. 12 is a diagrammatic plan view showing the invention of FIG. 1 and its alternate interface with the end of a feeding conveyor; and FIG. 13 is an elevational view of a foot support of the invention.

TRANSFER APPARATUS

Turning now to FIG. 1, a preferred embodiment of the invention includes a transfer apparatus 10 having rearward end 11 adjacent a conveyor C (phantom lines), and a forward end 12 positioned for access by a cart 13. The transfer apparatus 10 is provided with means for conveying loads (not shown) from and onto conveyor C, and for transferring loads onto and from cart 13. It will be appreciated that the invention is useful broadly for transferring loads between load handling apparatus such as between conveyors or between a conveyor and load handling apparatus such as a cart or load support. In the embodiment illustrated, transfer apparatus 10 utilizes chain driven live rollers R to complete conveyance and centering of loads with respect to conveyor C, and load shifting means 14 for transferring loads onto and from cart 13.

As will be appreciated, further load handling apparatus (illustratively shown) associated with conveyor C is operational to effect conveyance of loads from the conveyor toward transfer apparatus 10. In this regard, and by way of example only, conveyor C may comprise a chain conveyor for carrying pallet-mounted loads on the upper surfaces of two load bearing conveyor chains C-1 and C-2. Live or idler rollers C-3, having their axes A parallel to the conveyor direction D-1 of the chain conveyor, are selectively raised slightly between the chains and beneath the pallet to engage it and move it or permit it to be moved transversely off the chain conveyor in a direction D-2 toward the transfer apparatus 10. These details of such load handling apparatus are disclosed herein for illustration only and any suitable device operable to move a load toward and onto the transfer apparatus 10 can be used. Thus, it should also be appreciated that the transfer apparatus 10 has broader application in that it can be used with many forms of conveyors for transverse load take-off.

As well, transfer apparatus 10 can be utilized in-line at the discharge end of a conveyor for transferring loads moving in the conveyor direction to a cart or other apparatus at the discharge end. In such configuration, as diagrammatically illustrated in FIG. 12, transfer apparatus 10A comprises itself the discharge end of conveyor C-A. Conveyor C-A moves loads in the direction of arrow D-3 onto transfer apparatus 10A (which is identical to transfer apparatus 10) for transfer to a cart 13A, for example. Transfer apparatus 10A operates in the same conveyor direction D-3 as conveyor C-A.

Whether the transfer apparatus is disposed transversely or in-line with respect to a conveyor, it still functions, according to the invention, to transfer loads onto and from a cart or other apparatus without raising the load between the transfer apparatus and cart.

Returning now to FIG. 1, transfer apparatus 10 includes two spaced apart parallel reversible conveyor paths 15 and 16 defining a split or bifurcated conveyor means. Each conveyor path 15 and 16 is defined by a plurality of chain driven live rollers R having respective outside ends mounted in respective outer frame members 17 and 18, and inside frame members 19 and 20.

At the rearward end 11 of the transfer apparatus 10, two longitudinal rollers 21 and 22 extend completely across the conveyor and have their ends mounted in the outside frames 17 and 18, respectively. The adjacent ends of the rollers 21 and 22 are connected to an appropriate drive means such as a motor M and in a known manner, are also connected to the outside ends of the shorter rollers defining the separate conveying paths 15 and 16 for driving the shorter rollers. For example, each roller has a respective end provided with two sprockets, one for receiving a drive chain from a prior roller and one for driving a second chain connected to a downstream roller. With respect to rollers 21 and 22, each end of roller 22 is provided with two sprockets, one for receiving the motor's drive chain and one for driving a respective chain connected to the immediate adjacent roller R in each of paths 15 and 16. Thus the long rollers 21 and 22 serve to initially support a transferred load and as well to transfer driving force across the transfer apparatus from motor M to conveyor rollers R in path 15. Cover plates 17a and 18a, respectively, cover the drive chain and double sprocket ends of the rollers. Also, drip pans 17b and 18b constitute frame portions of the apparatus 10, and serve as well as bottom covers to the drive chains and sprockets.

The inner ends of the rollers R, respectively, are preferably mounted slightly rearwardly of the outer ends of the rollers so that the rollers R, in the respective paths 15 and 16, together form a herringbone-like pattern. Such disposition of the rollers R in the two paths centers loads which span the two paths as the loads move toward the cart. To accomplish this, the shafts comprising the axes of the rollers R are mounted in the inner frames 19 and 20 via slots 23 in the frame members (FIG. 2). Four adjustable lead bars 24–27 are mounted inwardly of each of the respective frames 19 and 20 and are secured to the frames by means of bolts 28 extending through slots 29 in the lead bars. The shafts of rollers R are secured in the lead bars and can be moved forwardly and rearwardly to adjust the herringbone pattern mentioned above. Thus by virtue of this described apparatus, the axes of the rollers R can be adjusted to extend perpendicularly with respect to the frame members 17–20, or to be inclined with respect thereto, to form the desired herringbone pattern. With respect to a load (not shown), resting on rollers R and spanning the paths 15 and 16, the rollers R, when in a herringbone pattern with their inward ends adjusted rearwardly of their respective outer ends, serve to perform a centering action, on any load conveyed thereon toward the cart 13. Proper centering facilities correct indexing of the loads onto a cart. Moreover, the adjustable lead bars can be used to adjust the orientation of the rollers when there is some alignment discrepancy between the respective frame members.

Returning now momentarily to the broader description of the transfer apparatus 10, FIG. 13 depicts details of support foot structure used at the four corners of apparatus 10. It will be appreciated that the apparatus is supported by outboard feet 125 and inboard feet 126 (FIG. 7). Inner frame members 47 and 48 of the apparatus 10 are further supported by support brackets 127 and 128, respectively, which are mounted on channels 129 and 130 as best seen in FIGS. 3 and 7 and which are attached to the respective feet 125. The upper ends of support angles 131 and 132 are connected to channel members 133 and 134 (FIG. 7) which extend across the conveyor paths 16 and 15 and are respectively attached to the inner frame members 47 and 48. Finally, it should be noted that an additional frame member 30 joins the rearward ends of the frame members 17 and 18. For clarity, portions of the details of the supporting foot structure have been omitted from various ones of the figures.

While the rollers R can be adjusted to provide load centering, the preferred embodiment also includes guides 31 and 32 mounted on unistrut supports 33 by means of adjustable angles 34 respectively. These guides are positioned just above the upper surface of rollers R for engaging a load and directing it toward the center of the apparatus 10.

The Shiftable Frame

The transfer apparatus 10 further includes a shifting means 14 for pushing loads onto and pulling loads from another conveyor, a cart or a load support. Shifting means 14 is shown in FIG. 1 in a retracted position, and in FIG. 5, for example, in an extended position. FIG. 3 depicts shifting means 14 in a partially extended position.

The shifting means or apparatus 14 includes an extensible frame comprising side frame members 35 and 36, rear frame member 37 and forward frame member 38. Side frame members 35 and 36 are provided with outer flanges 39 and 40, respectively, and with rollers 41–44, respectively, which are mounted at the rearward end of the extensible frame on frame members 35 and 36. As perhaps best shown in FIG. 7, the respective rollers 41–44 are disposed to engage flanges 45 and 46, respectively, which are in turn mounted on elongated inner frame members 47 and 48, respectively, of apparatus 10. By way of further explanation, the inner frame members 19 and 20 are mounted atop the inner frame members 47 and 48 as shown in FIG. 7. Additionally, the members 19 and 20 are coped off at their rear ends to accommodate the extension of the rollers 21 and 22 across the frame members 19 and 20.

Returning to a consideration of the extensible frame, flanges 39 and 40 are provided on the side frame members 35 and 36 and are disposed to be supported by the rollers 49 and 50, which are secured to frame member 47, and rollers 51 and 52, which are secured to frame member 48 (FIG. 8). In addition to the rollers 41–44 and 49–52 which function as the "running gear" for the extensible frame, the apparatus is also provided with bumper guides 53 and 54 mounted respectively on the frame members 47 and 48 and bumper guides 55 and 56 mounted respectively on the extensible frame members 35 and 36. These bumper guides extend outwardly of the respective supporting flanges which have been described and serve to engage the frame members of the extensible frame or the inner frame members 47 and 48, respectively, should the extensible frame move off center to one side or the other.

In order to operate the extensible frame a double acting air or hydraulic cylinder 60 is connected between the frame structure of the apparatus 10 and the extensible frame 14. As perhaps best seen in FIGS. 5 and 6, cylinder 60 is connected via a pivot collar 61, and trunnion mounts 62 and 63, to a channel frame member 64 which extends across the inner frame members 47 and 48. The cylinder is thus pivotable about the axis provided by the trunnion mounts 62 and 63 and the pivot collar 61.

The cylinder has a shaft 65, the forward end of which terminates in a clevis 66 pivoted to a clevis mount 67 on the forward frame member 38 of the extensible frame. The cylinder is operably connected to a suitable control such that when actuated the shaft 65 is extended to push the extensible frame outwardly of the apparatus 10 and to the right as viewed in the respective figures. When the shaft 65 is operably retracted, the extensible frame is retracted into its position as shown in FIG. 2.

Shifting Dogs

In order to render the extensible frame operable to transfer loads from the apparatus 10 onto the cart 13, for example, to move loads from the cart 13 onto the apparatus 10, and to operate in selectively reversible directions, the frame is provided with selectively actuable dogs 80 and 81. Each dog is similarly mounted across the extensible frame member by virtue of bearing blocks 82 and 83, with respect to rear dog 81, and blocks 84 and 85, with respect to the forward dog 80. FIG. 11 depicts the mounting of the rearward dog 81 which is similar to that of forward dog 80.

As shown, dog 81 includes a sleeve 86 adapted for receiving a shaft 87 which extends through the bearing blocks 82 and 83 thus pivotally mounting the dog. Sleeves or bushings 88 can be used as shown between the sleeve 86 and the shaft 87 to provide a bearing so that the sleeve 86 is rotatable on the shaft 87. With further respect to the rear dog 81, depending counterweights 89 and 90 are secured to the sleeve 86. Since the counterweights 89 and 90 are heavier than the upper portion of the dog 81 above the shaft 87, the counterweights tend to hold the dog 81 in a vertical position. A stop 91 (FIG. 11) is provided in order to prevent the dog 81 from rotating any further rearwardly than the vertical position as shown in FIG. 11 and, for example, as shown in FIGS. 2 and 3. Thus any load pressure, for example, which would tend to move the dog 81 rearwardly and in a counterclockwise direction about the shaft 87 (as viewed in FIGS. 2 and 3), for example, are not operable to do so due to stop 91.

Forward dog 80 is similarly mounted to the top of the frame members 35 and 36 via bearing blocks 84 and 85. The dog 80 also includes a sleeve 95 and depending counterweight portions 96 and 97 all rotatably mounted on shaft 98. A stop (not shown) similar to stop 91 described in connection with dog 81, is provided to stop counterweight 96 and thus dog 80 from rotating in a clockwise direction past the vertical.

The actuating mechanism for the dogs 80 and 81 will now be described. An actuating crank arm 101 is secured to the shaft 87 associated with rear dog 81 and extends downwardly. A bracket 103 is pivoted at 102 to the lower end of arm 101 and is secured to an elongated bar 104. The elongated bar 104 extends forwardly from the bracket 103 to a bracket 105 which is pivoted at 106 to crank arm 107. Arm 107 is associated with the forward dog 80 and is secured to shaft 98.

Bracket 103 is pivoted to the arm 101 by means of a pin 108 which extends through the bracket, through the crank arm 101, and across or in front of the counterweight 89. Pin 108 is positioned such that the counterweight 89 does not engage it, but rather counterweight 90 engages the angle stop 91 to keep dog 81 from moving any further rearwardly (counterclockwise) than its vertical position as shown in FIG. 11. In addition, it should be noted that bracket 105 is pivoted at 106 to the crank arm 107 by means of a pin 109 which extends across a rearward side of the counterweight 97. As with the rear dog structure, counterweight 97 does not engage pin 109 when the dog 80 is in its upright or vertical position. Rather, counterweight 96 engages an angle stop (not shown) to keep the dog from rotating forwardly or in a clockwise direction, as viewed in FIG. 4, any further than its vertical position as shown in FIG. 4. Thus, it will be appreciated that a stop (not shown) similar to stop 91 is provided on frame member 36 similarly to stop 91 but in association with the depending counterweight 96 of the dog 80 in order to provide a stop means for the dog 80 in the vertical position as shown in FIG. 4.

A double acting fluid (air or hydraulic) cylinder 115 is provided for selectively actuating the dogs 80 and 81. The air cylinder 115 is pivotally secured via a bracket 116 to an elongated frame member 117 which extends across the extensible frame and is connected to frame members 35 and 36. The cylinder 115 has a shaft 118 which is selectively extendable and retractable as desired.

The shaft 118 is connected at its forward end to a bracket 119 which is pivotally secured by a pin 120 to the crank arm 101. Thus, it will be appreciated that when the shaft 118 is extended from the cylinder 115 the crank arm 101, as viewed in FIG. 4, is rotated clockwise. This motion also rotates the bottom of the crank arm 101 so that pin 108 engages the bottom of the counterweight 89 and rotates the dog 81 clockwise thus, in effect, lowering the dog to the positions as shown in FIG. 4 and FIG. 6. In this position, the dog 81 is beneath the lower surface of a pallet P for example, residing on the cart 13 as shown in FIG. 6. Moreover, when the shaft 118 is extended the pin 108, by virtue of its connection through bracket 103, pulls bar 104 rearwardly. Since bar 104 at its forward end carries bracket 105 and pin 109, pin 109 is moved rearwardly to its position as shown at FIG. 4, thus permitting the dog 80 to swing to its upright vertical position as shown in FIG. 4 and in FIG. 6, for example.

When the shaft 118 is retracted into the cylinder 115, however, the crank arm 101 is rotated in a counterclockwise direction about the axis formed by shaft 87. This serves to move the pin 108 also in a counterclockwise direction which permits the dog 81 to simply follow the pin and move into its upright vertical position such as shown in FIG. 2, for example. Simultaneously, of course, the bar 104 is extended forwardly and pin 109 engages the depending counterweight 97 of the dog 80 to rotate the dog 80 into its lowered position such as shown in FIGS. 2 and 3, for example.

Thus the dogs are positively controlled to move to their retracted position, but when not engaged by the respective actuating pins they are free to rotate into their upright position into the load path. It will be appreciated that if the shiftable frame is extended or retracted so that the rear side of either dog hits a load, the dog will simply pivot under the load. This eliminates jamming or inadvertent shoving of a load in an undesired direction. Further, the combination of such dogs and the dog controlling apparatus herein described provides a reversing capability to the transfer apparatus by the use of different load engaging dogs, each of which is respectively inoperative to interfere with the operation of the other.

The Cart

Considering now further details of the cart 13, its features are partially shown in phantom in FIG. 1 and FIG. 6. Of course, while a cart is shown for receiving or delivering loads, it will be appreciated that the transfer apparatus 10 can be used in conjunction with various types and forms of load supports or conveyors. Basically, the cart 13, however, may be of any suitable type having four wheels 140, frame structure 141, and load supporting skids 142 and 143. Each skid is provided with a respective guide 144, 145 which has a flared end 146 and 147, respectively. The cart is constructed to such a dimension that the load supporting surface of the skids 142 and 143 reside in substantially the same plane as the top of the rollers R, thus loads can be pushed directly from the transfer apparatus 10 onto the cart without requiring any vertical adjustment of the loads. The flared ends 146 and 147 of the guides 144 and 145 serve to facilitate the placement of a particular load on the skids 142 and 143 should the load or the cart be slightly out of alignment with respect to the other during the transfer.

The cart may be indexed into appropriate position with respect to the transfer apparatus 10 by any suitable means. For example, selected angle guides and stops could be placed in association with a transfer apparatus 10 for engaging the wheels 140 of the cart to accurately position it with respect to the apparatus 10. Alternately, a mechanical positioning means, manually or tape controlled, could be utilized in order to accurately position the cart. Also, the cart could be powered by means controlled by limit switches or photocells, for example, to position the cart.

Operation

Turning now to a description of the use of the invention as described herein, it will be noted that the apparatus 10 is particularly useful in transferring loads between a conveyor C and a cart 13, for example. Such loads are diagrammatically shown in FIGS. 2, 3 and 6 and in one embodiment comprise, for example, load bearing pallets P.

Conveyor to Cart Transfer

In a typical installation, the transfer apparatus 10 is disposed for transferring loads from a conveyor C onto a cart 13. The transfer apparatus 10 is oriented adjacent to a conveyor C on which pallets P are transferred in the direction indicated by arrow D-1 by the side conveyor chains C-1 and C-2. When the loads reach a position on the conveyor C where they are aligned with the apparatus 10, the transfer rollers C-3 are actuated to engage the pallets so that the pallets can be moved toward the transfer apparatus 10 in a direction D-2 perpendicular to the direction D-1. As herein described, the rollers C-3 can be live rollers, or merely idler rollers permitting the pallet to be pushed onto the apparatus 10.

FIG. 2 illustrates a pallet P partially moving onto the apparatus 10. In FIG. 2, the pallet P is shown supported by driven rollers 21 and 22 and by the first roller R at the rear end of the apparatus 10. When it is desired to transfer a load onto apparatus 10, motor M is energized to drive rollers 21, 22 and R to convey the load in the direction of cart 13. Due to the rearward inclination of the inner end of rollers R, the load is centered on the apparatus 10.

FIG. 2 depicts the normal position of the dogs 80 and 81. Forward dog 80 is tilted to its lower position by means of the rod 104 and the retracted condition of the cylinder 115, while dog 81 is in a vertical position. As the pallet P is transferred onto the apparatus 10, its forward edge engages the rearward side of the dog 81 and rotates the dog clockwise to the position in the dotted lines of FIG. 2. Thus, the dog is simply rotated, by engagement of the pallet, to an inoperative position so that the pallet can slide over the dog. The drive by the motor M continues until a limit switch (not shown) is actuated to stop the drive motor M through a suitable control means (not shown). It will be appeciated that the pallet P can be moved forwardly, even over the position occupied by the dog 80, due to the retracted or downwardly titled position of the dog 80. Once the rear end of the pallet has passed the dog 81, the dog 81, by means of counterweights 89 and 90, returns to its upright position such as shown in FIG. 2.

At this point, the extensible frame can be operated to transfer the pallet P onto the cart 13 by means of energization of the cylinder 60. When the shaft 65 of the cylinder 60 is extended, the extensible frame moves out of the forward end 12 of the transfer apparatus 10 and across the cart 13. As the extensible frame is extended outwardly across the cart 13, the dog 81 engages the rear edge of the pallet P and pushes it forwardly onto the skids 142 and 143 of the cart.

FIG. 3 depicts the partial extension of the extensible frame and movement of the pallet P toward the forward end 12 of the apparatus 10. As the extensible frame moves toward the cart, it will be appreciated that it moves between the skids 142 and 143, the upper surfaces of the extensible frame being located below the surfaces of the skids 142 and 143 so as not to interfere with any loads on the skids or on the rollers R.

Continuing with this cycle, the frame is completely extended from the position shown in FIG. 2 through the position shown in FIG. 3 and to the positions shown in FIGS. 5, 6 and 10, for example. In FIG. 6, the pallet P is depicted as having been moved onto the cart 13 and more particularly onto the skid 142 between the guides 144 and 145. When it is desired to leave the pallet P on the cart 13, so the pallet and cart can move to another position, for example, the cylinder 115 is maintained in its normally retracted condition and the dog 80 is retained in its lowered position as shown, for example, in FIG. 10. In this position then the extensible frame can be retracted into the apparatus 10, dog 80 simply moving underneath the pallet P on the cart 13 and leaving the pallet P on the cart.

When it is desired, however, to return the pallet P to the transfer apparatus 10 by unloading the cart 13 (direction D-4), it should be appreciated that as depicted in FIG. 6, the cylinder 115 is operated to extend its shaft 118. This rotates the crank arm 101 to the position shown in FIGS. 4 and 6 and causes the pin 108 to engage depending counterweight 89 of the dog 81, thus retracting the dog 81 into its lowered position. At the same time, pin 109 is moved rearwardly by means of the rearward movement of the bar 104 and this permits the counterweight 97 to follow the pin down thus rotating the dog 80 into its upright position.

The cylinder 60 is actuated to retract the shaft 65 and the extensible frame is retracted into the apparatus 10. During this motion, dog 80 pulls the pallet P back onto the transfer apparatus 10. Of course, the angle stop provided on the extensible frame for engaging the counterweight 96 operates to maintain the dog 80 in its upright position for pulling the pallet P.

Cart to Conveyor Transfer

The foregoing description of transfer of pallet P from the cart 13 onto the apparatus 10 has assumed that the frame was already extended across the cart 13. It will be appreciated, however, that in a situation where the extensible frame is retracted into the apparatus 10 and it is then desired to move a load from the cart onto the apparatus, the frame can be extended when the cylinder 115 is either retracted or extended. If retracted, dog 80 will remain beneath pallet P on the cart as the frame is extended. If cylinder 115 is extended, dog 80 will be vertical, however, upon its rear side hitting pallet P on the cart, the dog will pivot and slide beneath the pallet to its other side where it will flip up by virtue of the counterweights.

Once the frame is extended under the pallet, it can be retracted so that dog 80 pulls the pallet from the cart onto the transfer apparatus 10. From there, the pallet can be stored on the transfer, returned to the same or another cart, or conveyed to a conveyor such as conveyor C. If the pallet is conveyed to conveyor C, guides 31 and 32 serve to center the pallet on the apparatus 10, despite the orientation of rollers R. Of course, when the pallet is to be moved onto a conveyor C, for example, the cylinder 115 must be extended in order to lower dog 81 to permit passage of the pallet.

Any suitable control means such as will be appreciated by those of ordinary skill in the art can be used in order to provide the operations described herein by controlling the motor M and the cylinders 115 and 60. Moreover, control interlocks can be provided for ensuring correct dog position as will be appreciated. The specific controls comprise no part of this invention. It will also be appreciated that limit switches or other control input devices can be used to signal the position of the extensible frame, the position of the dogs, the position of the pallet on the apparatus 10, or on the frame and/or the positions of the pallet P on the conveyor C or on cart 13.

Accordingly, transfer apparatus 10 provides for the efficient transfer of articles from a conveyor C to a cart or another conveyor or load supporting apparatus all without requiring any vertical adjustment of the load between the transfer apparatus 10 and the cart, load support or other conveyor apparatus, and at the same time without requiring any other form of conveying apparatus on the cart except for, of course, appropriate load skids supports such as 142 and 143.

Also, of course, it will be appreciated that while the preferred embodiment includes two long spanning rollers 21 and 22, these could be eliminated and means provided for shifting the frame in either direction outwardly of the transfer apparatus in order to accommodate a specific application where the frame must be used to draw loads onto the apparatus from both sides.

These and other advantages and modifications will become readily apparent to those of ordinary skill in the art without departing from the scope of this invention and the applicant intends to be bound only by the claims appended hereto.

I claim:

1. Transfer apparatus for transferring loads in a direction between a load conveyor and a load transporting cart, said load conveyor including means for moving said load toward said transfer apparatus, and said load having a predetermined dimension parallel to said direction, said transfer apparatus including:
    an elongated frame and conveying means supported therein for receiving loads at least from said conveyor, and for conveying loads between said conveyor and said cart,
    said cart being movable into a position adjacent said elongated frame,
    said conveying means defining two separate, spaced apart, conveying paths extending in substantially the same said direction, loads on said transfer apparatus spanning portions of said two paths, and
    load shifting means disposed between said conveying paths and having forward and rearward rotatable dogs thereon, said rearward dog being selectively engageable with loads for shifting loads from said transfer apparatus off said conveying means in said same direction onto said cart, said forward dog being extensible outwardly from said elongated frame a distance at least equal to said predetermined dimension and into an area coincidental with that occupied by said cart for selectively and positively pushing loads onto said cart and pulling loads from said cart.

2. Apparatus as in claim 1 wherein said conveying paths are in the same plane and said cart includes load support means in said same plane for receiving transferred loads.

3. Apparatus as in claim 2 wherein said shifting means includes a shiftable frame extensible from said elongated frame to a position between the load support means on said cart.

4. Apparatus as in claim 3 wherein said load support means on said cart comprise load skids extending in the same direction as said two paths.

5. Apparatus as in claim 3 wherein said rear dog is mounted on a rearward end of said shiftable frame, and said forward dog is mounted on a forward end of said shiftable frame, said rear dog engaging a load on said transfer apparatus when said shiftable frame is extended from said transfer apparatus to push said load onto said cart.

6. Apparatus as in claim 5 wherein said forward dog on said shiftable frame is selectively retractable beneath said plane when said frame is retracted into said transfer apparatus to leave said load on said cart.

7. Apparatus as in claim 5 wherein when loads are moved from said conveyor onto said transfer apparatus, said rear dog is rotated beneath said plane in response to engagement of said load therewith.

8. Apparatus as in claim 3 wherein said forward dog is selectively rotated into position above said plane, when said frame is extended, to engage loads on said cart and to pull them onto said transfer apparatus when said shiftable frame is retracted toward said transfer apparatus.

9. Apparatus as in claim 8 wherein said rear dog is positively and selectively rotatable beneath said plane, and said conveying means of said transfer apparatus is operable to convey loads thereon over said dog toward said conveyor.

10. Apparatus as in claim 1 wherein said dogs are normally extended upwardly into the path of a load on said conveying means, and each have a respective load engaging face facing the face of the other dog, said dogs being movable out of said plane when respectively engaged by a load on a side opposite said load engaging face.

11. Apparatus as in claim 10 wherein said dogs are operatively connected to a common control link in one position for selectively and positively lowering one dog beneath said plane and permitting the other dog to extend above said plane, and in another position positively lowering the other dog and permitting the one dog to extend above said plane.

12. Apparatus as in claim 1 wherein said two separate spaced apart conveying paths define parallel roller conveyors, each having rollers with inner ends disposed rearwardly of their respective outer ends.

13. Apparatus as in claim 1 wherein said conveying means further includes at least one roller spanning both said spaced apart conveying paths and disposed between said paths and said load conveyor.

14. Apparatus as in claim 13 including sprocket means on both ends of said one spanning roller, one end being connected to means for driving said roller and one of said conveying paths, and another end across said apparatus being operatively connected to means for driving the other of said conveying paths.

15. Transfer apparatus for transferring loads between a conveyor and another load handling apparatus, said transfer apparatus including,
    an elongated frame,
    load conveying means mounted on said frame for receiving and conveying a load along said transfer apparatus, said conveying means defining two separate spaced apart load conveying runs, each with load carrying surfaces, portions of which are disposed in the same load conveying plane,
    shifting means disposed between said runs for shifting loads from said transfer apparatus, said shifting means comprising a shiftable frame having selectively operable load engaging dogs mounted thereon, said shiftable frame being extensible outwardly of said elongated frame for transferring loads, and means independent of said loads for selectively and positively rotating said dogs downwardly beneath said load conveying plane.

16. Apparatus as in claim 15 wherein said shifting means comprises an extensible frame and further including a double acting fluid cylinder for extending and retracting said frame, said cylinder being pivotally mounted on said elongated frame and having an actuating shaft attached to a forward end of said extensible frame.

17. Apparatus as in claim 15 wherein said dogs are pivotally mounted adjacent respective forward and rearward ends of said shiftable frame, each of said dogs including depending counterweights normally biasing said dogs toward a vertical position in said load conveying.

18. Apparatus as in claim 17 wherein said means for selectively rotating said dogs include a crank arm, a fluid cylinder having a shaft operatively attached to said crank arm, means on said crank arm for rotating one of said dogs, a second crank arm operatively disposed adjacent another dog, means on said second crank arm for rotating said other dog and a connecting link operatively connecting said two crank arms for rotation by said cylinder shaft.

19. Apparatus as in claim 18 wherein said first crank arm is rotated, when said shaft is extended, to rotate said one dog below said load conveying plane and said second crank arm is rotated by said link to permit said other dog to rotate above said plane.

20. Apparatus as in claim 18 wherein said first crank arm is positioned, when said shaft is retracted, to permit said one dog to rotate up above said load conveying plane, and said second crank arm is rotated by said link to rotate said other dog below said plane.

21. Apparatus as in claim 18 wherein each of said dogs are free to rotate below said plane in response to engagement of a load against a rearward side of the respective dog.

22. Apparatus as in claim 15 including first flange runner means on said elongated frame and first support roller means on a rear end of said shiftable frame for supporting a rear end of said shiftable frame on said first flange runner means.

23. Apparatus as in claim 22 including second flange runner means on said shiftable frame and second support roller means on a forward end of said elongated frame for supporting said second flange runner means and said shiftable frame as said shiftable frame is extended and retracted.

24. Apparatus as in claim 15 including at least one elongated roller spanning said elongated frame at a rearward end thereof and having sprocket means on each end thereof for driving the respective load conveying runs.

25. A method of transferring loads between a conveyor and a load handling apparatus comprising the steps of:
moving said load from said conveyor toward a transfer apparatus comprising an elongated frame having conveying means thereon,
conveying said load on said transfer apparatus in one direction and over a rearward dog mounted on one end of a shiftable frame and pivoted downwardly by said load,
engaging said load from beneath said load and from beneath said conveying means centrally thereof by said dog after said downward pivoting,
moving said shiftable frame forwardly beyond said elongated frame a distance at least as long as said load in its direction of movement, and shifting said load in said one direction and in the same plane onto said load handling apparatus by pushing said load with said rearward dog on said frame, selectively and positively rotating a forward dog, mounted on said frame, downwardly, and
retracting said frame, said forward dog moving under said load.

26. A method as in claim 25 including the step of centering said load on said transfer apparatus during said conveying step.

27. A method as in claim 26 wherein said moving step includes moving said load transversely from said conveyor toward said transfer apparatus.

28. A method as in claim 26 wherein said moving step includes moving said load from said conveyor onto said transfer apparatus in the same direction as said conveyor conveys said load.

29. A method of transferring loads between a load support and a main conveyor wherein transfer apparatus includes an elongated frame and a shiftable frame with selectively activated dogs pivotally mounted at respective forward and rearward ends thereof, said method comprising the steps of:
extending a forward end of said shiftable frame beneath said load support beyond said elongated frame, selectively raising a forward load shifting dog mounted on a forward end of said frame, retracting said frame to a position between two transfer conveyors and pulling said load onto said two conveyors by engaging said load with said forward dog from beneath said load and from beneath said two transfer conveyors, conveying said load onto said main conveyor, and positively engaging a rearward dog with a dog engaging element on said transfer apparatus, thereby maintaining said rearward dog beneath said load to permit said load to move over said dog onto said main conveyor.

30. Transfer apparatus for transferring loads in a direction between a load conveyor and a load handling apparatus, said apparatus including:
an elongated frame and conveying means supported therein for receiving loads from and transferring loads to said conveyor, and for conveying loads between said load conveyor and said load handling apparatus,
said conveying means defining two separate, spaced apart, conveying paths extending in substantially the same said direction, loads on said transfer apparatus spanning portions of said two paths,
load shifting means disposed between said conveying paths and having forward and rearward rotatable dogs thereon,
said rearward dog being pivoted beneath loads moving from said load conveyor thereover and being selectively engageable with loads having moved thereover for shifting loads from said transfer apparatus off said conveying means in said same direction onto said load handling apparatus,
said forward dog being positively and selectively retractable beneath said load to permit said load shifting means to be retracted from beneath said load or said load handling apparatus without engaging said load, and said forward dog being selectively pivoted upwardly for engaging loads on said load handling apparatus and pulling loads onto said conveying means.

31. Transfer apparatus for transferring loads between a conveyor and another load handling apparatus, said loads having a dimension in the direction of transfer, and said transfer apparatus including,
an elongated frame,
load conveying means mounted on said frame for receiving and conveying a load along said transfer apparatus, said conveying means defining two separate spaced apart load conveying runs, each with load carrying surfaces, portions of which are disposed in the same load conveying plane,
shifting means disposed between said runs for shifting loads from said transfer apparatus, said shifting means comprising a shiftable frame having selectively operable load engaging dogs mounted at forward and rearward ends thereof, and including means for selectively and positively rotating said dogs beneath said load conveying plane, and selectively above said plane, and said shiftable frame being extensible outwardly of and beyond said elongated frame for transferring loads, a dog on said forward end thereof being movable beyond said load conveying means a distance at least equal to said dimension of said loads.

32. Apparatus as in claim 1 further including means independent of said loads for selectively and positively engaging said dogs and rotating them beneath said conveying path.

* * * * *